(12) United States Patent
Matsubara

(10) Patent No.: US 10,887,441 B2
(45) Date of Patent: Jan. 5, 2021

(54) INFORMATION PROCESSING SYSTEM, WIRELESS TERMINAL, AND INFORMATION PROCESSING METHOD

(71) Applicant: Maxell, Ltd., Kyoto (JP)

(72) Inventor: Takashi Matsubara, Tokyo (JP)

(73) Assignee: Maxell, Ltd., Kyoto (JP)

( * ) Notice: Subject to any disclaimer, the term of this patent is extended or adjusted under 35 U.S.C. 154(b) by 0 days.

(21) Appl. No.: 16/799,903

(22) Filed: Feb. 25, 2020

(65) Prior Publication Data

US 2020/0195888 A1 Jun. 18, 2020

Related U.S. Application Data

(63) Continuation of application No. 15/775,414, filed as application No. PCT/JP2015/082821 on Nov. 24, 2015, now Pat. No. 10,616,529.

(51) Int. Cl.
*H04N 7/14* (2006.01)
*H04M 1/725* (2006.01)
(Continued)

(52) U.S. Cl.
CPC ......... *H04M 1/7253* (2013.01); *H04M 3/567* (2013.01); *H04N 7/142* (2013.01);
(Continued)

(58) Field of Classification Search
CPC .............. H04M 1/0272; H04M 1/6041; H04M 1/7253; H04M 2201/50; H04M 3/563;
(Continued)

(56) References Cited

U.S. PATENT DOCUMENTS 8,639,214 B1 * 1/2014 Fujisaki ............... H04M 11/007
455/406
8,676,273 B1 * 3/2014 Fujisaki ............... H04M 1/0202
455/567
(Continued)

FOREIGN PATENT DOCUMENTS

JP 11-074977 A 3/1999
JP 2002-314962 A 10/2002
(Continued)

OTHER PUBLICATIONS

International Search Report of PCT/JP2015/082821 dated Feb. 9, 2016.

*Primary Examiner* — Khai N. Nguyen
(74) *Attorney, Agent, or Firm* — Mattingly & Malur, PC

(57) ABSTRACT

An information processing system including a video device for displaying a video and a wireless terminal for communicating with the video device and communicating with other apparatuses via a network, wherein the video device transmits video information captured by a camera and sound information collected by a microphone when reception from the wireless terminal of information pertaining to a video to be displayed is detected, and outputs the received sound information using a speaker. The wireless terminal transmits information pertaining to the video to be displayed to the video device, the other apparatuses receive the captured video information and collected sound information via the network, and transmit information pertaining to the video to be displayed and information pertaining to the sound to be outputted.

4 Claims, 12 Drawing Sheets

(51) Int. Cl.

| | | |
|---|---|---|
| *H04W 12/06* | (2009.01) | |
| *H04N 7/15* | (2006.01) | |
| *H04M 3/56* | (2006.01) | |
| *H04W 4/06* | (2009.01) | |
| *H04M 1/60* | (2006.01) | |
| *H04M 1/02* | (2006.01) | |

(52) U.S. Cl.
CPC ............... *H04N 7/147* (2013.01); *H04N 7/15* (2013.01); *H04W 4/06* (2013.01); *H04W 12/06* (2013.01); *H04W 12/0608* (2019.01); *H04M 1/0272* (2013.01); *H04M 1/6041* (2013.01); *H04M 3/563* (2013.01); *H04M 2201/50* (2013.01); *H04N 7/152* (2013.01); *H04N 2007/145* (2013.01)

(58) Field of Classification Search
CPC . H04M 3/567; H04N 2007/145; H04N 7/142; H04N 7/147; H04N 7/15; H04N 7/152; H04W 12/06; H04W 12/0608; H04W 4/06
USPC ........... 348/14.01, 14.07, 14.08, 14.09, 14.1, 348/14.12
See application file for complete search history.

(56) References Cited

U.S. PATENT DOCUMENTS

| | | | |
|---|---|---|---|
| 9,215,406 B2* | 12/2015 | Paripally | H04N 7/147 |
| 9,503,689 B2* | 11/2016 | Paripally | H04N 7/148 |
| 10,616,529 B2* | 4/2020 | Matsubara | H04W 4/06 |
| 2003/0169285 A1* | 9/2003 | Smith | H04N 7/181 |
| | | | 715/716 |
| 2005/0086309 A1* | 4/2005 | Galli | G06Q 10/107 |
| | | | 709/206 |
| 2008/0244019 A1* | 10/2008 | Mellor | H04L 51/04 |
| | | | 709/206 |
| 2009/0135311 A1* | 5/2009 | Kurita | H04N 21/43637 |
| | | | 348/739 |
| 2011/0004481 A1* | 1/2011 | Jones | G06F 3/0488 |
| | | | 705/1.1 |
| 2012/0056971 A1* | 3/2012 | Kumar | H04N 7/15 |
| | | | 348/14.02 |
| 2013/0169736 A1* | 7/2013 | Lindblom | H04L 65/403 |
| | | | 348/14.02 |
| 2013/0201356 A1* | 8/2013 | Kennedy | H04N 1/00244 |
| | | | 348/207.11 |
| 2013/0249959 A1* | 9/2013 | Umehara | H04N 9/3144 |
| | | | 345/690 |
| 2014/0179230 A1* | 6/2014 | Sydir | H04W 4/029 |
| | | | 455/41.2 |
| 2014/0259136 A1* | 9/2014 | Levy | H04W 12/0602 |
| | | | 726/7 |
| 2014/0267545 A1* | 9/2014 | Paripally | H04N 7/15 |
| | | | 348/14.02 |
| 2015/0341435 A1* | 11/2015 | Hamada | H04L 67/1078 |
| | | | 709/205 |
| 2016/0065827 A1* | 3/2016 | Dye | G06F 3/0484 |
| | | | 348/211.2 |
| 2016/0073057 A1* | 3/2016 | Paripally | H04N 7/147 |
| | | | 348/14.08 |
| 2017/0031530 A1* | 2/2017 | Ikeda | H04N 9/3179 |
| 2018/0352192 A1* | 12/2018 | Matsubara | H04N 7/142 |
| 2020/0195888 A1* | 6/2020 | Matsubara | H04N 7/142 |

FOREIGN PATENT DOCUMENTS

| | | |
|---|---|---|
| JP | 2004-239968 A | 8/2004 |
| JP | 2006-235159 A | 9/2006 |
| JP | 2009-130874 A | 6/2009 |
| JP | 2010-178254 A | 8/2010 |
| JP | 2014-135617 A | 7/2014 |
| JP | 2015-002516 A | 1/2015 |

* cited by examiner

F I G. 4
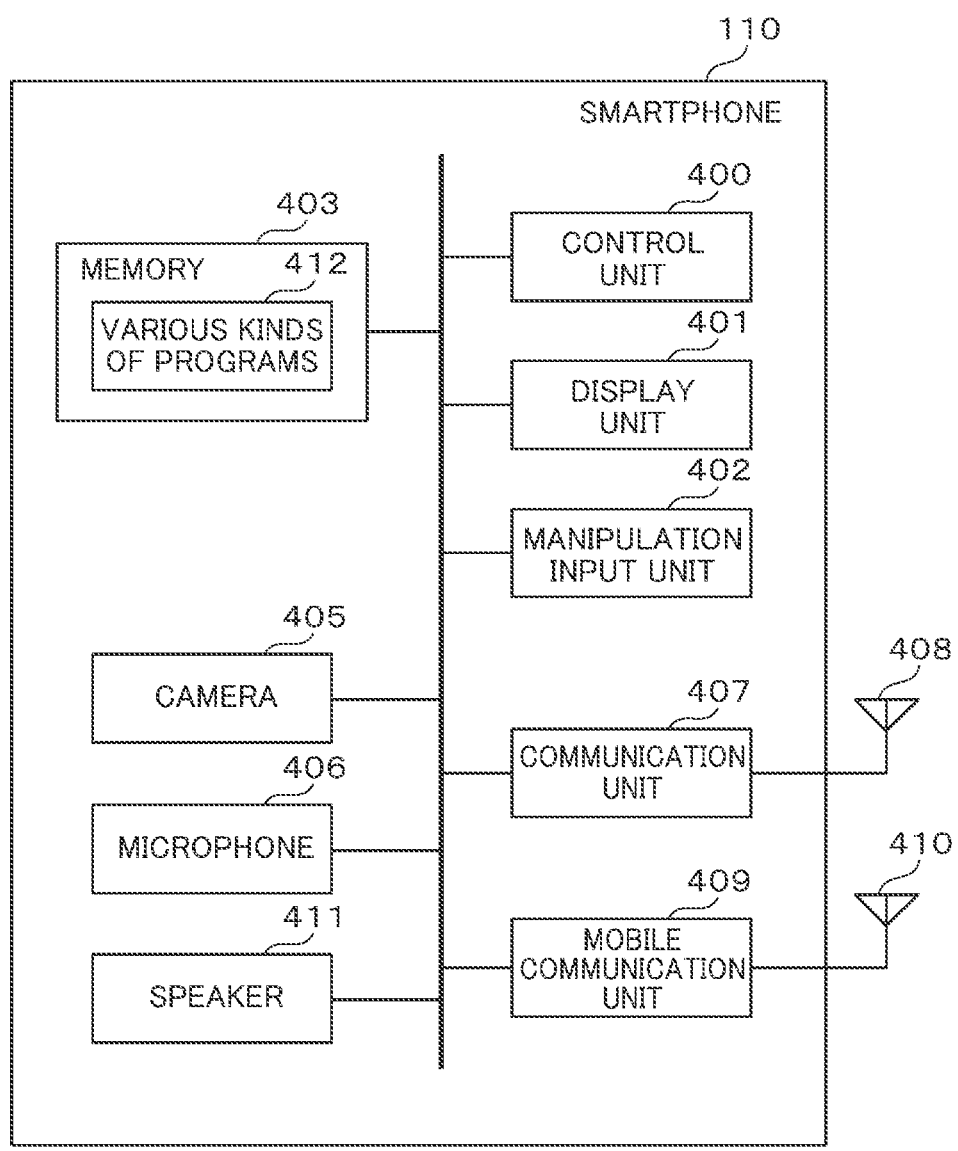

F I G. 6 A
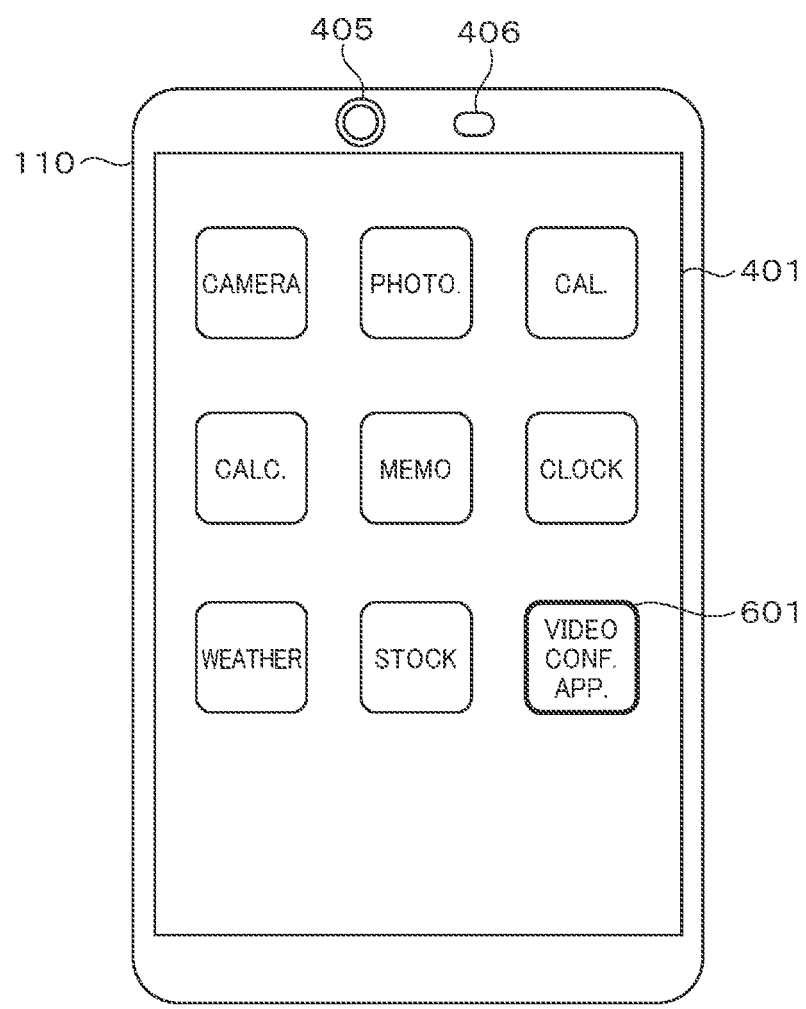

F I G. 6B
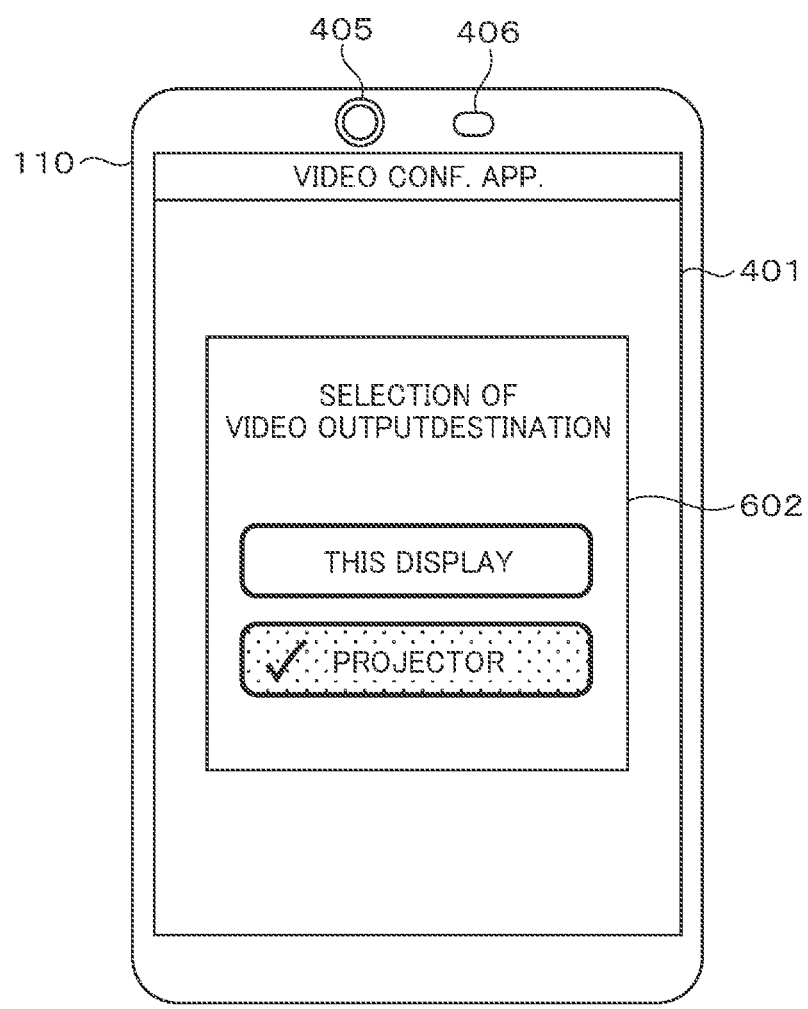

F I G. 6 C
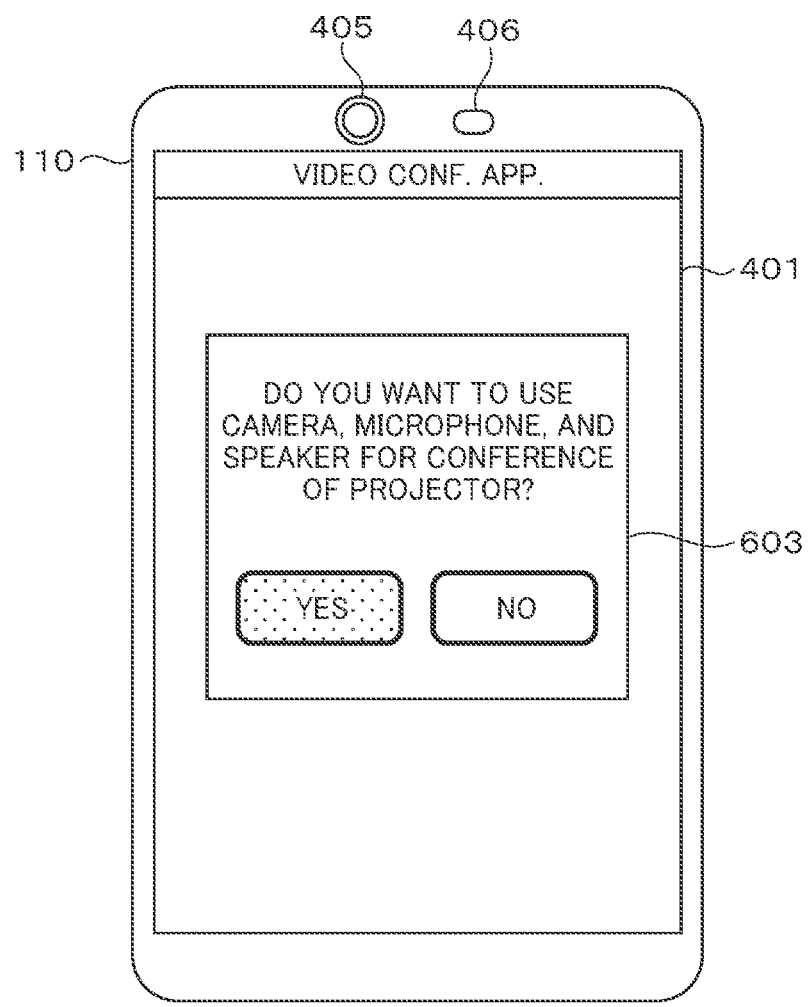

INFORMATION PROCESSING SYSTEM, WIRELESS TERMINAL, AND INFORMATION PROCESSING METHOD

TECHNICAL FIELD

The present invention relates to an information processing system, a wireless terminal, and an information processing method.

BACKGROUND ART

As a background technology in the present technical field, in order to provide "a projector capable of enabling a user to appropriately participate in or appropriately view a video conference or a remote presentation performed on a network", "a projector which is connected with one or more projectors via a network and includes an input means for receiving an input of a video signal, a determining means for determining the presence or absence of the input of the video signal in the input means, a projecting means for projecting an image on the basis of the video signal, and a mode selecting means for selecting a server mode or a client mode on the basis of a determination result of the determining means, wherein, when the client mode is selected, video data to be projected by the projector is received from the projector in the server mode on the network, and the received video data is output to the projecting means, and when the server mode is selected, the video data to be projected by the projecting means is transmitted to the projector in the client mode on the network" is disclosed in Patent Document 1.

CITATION LIST

Patent Document

Patent Document 1: JP 2004-239968 A

SUMMARY OF THE INVENTION

Technical Problem

By using the technique disclosed in Patent Document 1, it is possible to participate in the video conference as appropriate. However, in order to participate in the video conference, it is necessary for a device such as a projector to establish a connection with the video conference server and transmit authentication information, and thus usability is bad. There is a video call or a video conference by a smartphone, and there is already authentication for this, but cooperation between the smartphone and the projector is not taken into consideration.

In this regard, it is an object of the present invention to improve the usability of the user.

Solution to Problem

In order to solve the above problem, for example, configurations described in claims set forth below are employed.

The present application provides a plurality of configurations for solving the above-mentioned problems, and as an example, provided is an information processing system, including a video device that displays a video and a wireless terminal that performs communication with the video device and performs communication with another apparatus via a network, wherein the video device transmits, if reception of information of the video to be displayed from the wireless terminal is detected, the video information captured by a camera and sound information collected by a microphone, and output received sound information through a speaker, the wireless terminal transmits information of the video to be displayed to the video device, and the other apparatus receives the captured video information and the collected sound information via a network and transmit video information to be displayed and sound information to be output via the network.

Advantageous Effects of the Invention

According to the present invention, it is possible to improve the usability of the user.

BRIEF DESCRIPTION OF THE DRAWINGS

FIG. 4 is a diagram illustrating an example of a configuration of a smartphone.

FIG. 6A is a diagram illustrating an example of a first screen display of a smartphone.

FIG. 6B is a diagram illustrating an example of a second screen display of a smartphone.

FIG. 6C is a diagram illustrating an example of a third screen display of a smartphone.

DESCRIPTION OF EMBODIMENTS

Hereinafter, exemplary embodiments of the present invention will be described with reference to the appended drawings. Each of the following embodiments is applied to a system in which transmission and reception of a video captured by a camera and a sound collected by a microphone are performed between terminals at remote sites via a network (hereinafter referred to as a "video conference system") as an example, but the video conference system is not limited to the following embodiments. Further, a system is not limited to the video conference system.

First Embodiment

A first embodiment will be described in connection with a configuration in which, when a video conference with a remote site is performed using a video conference application of a smartphone (a wireless terminal), the smartphone performs the video conference using a video and a sound obtained by a video conference camera, a microphone, and a speaker which are installed in a projector and suitable for the use by a plurality of persons.

Figure 1:
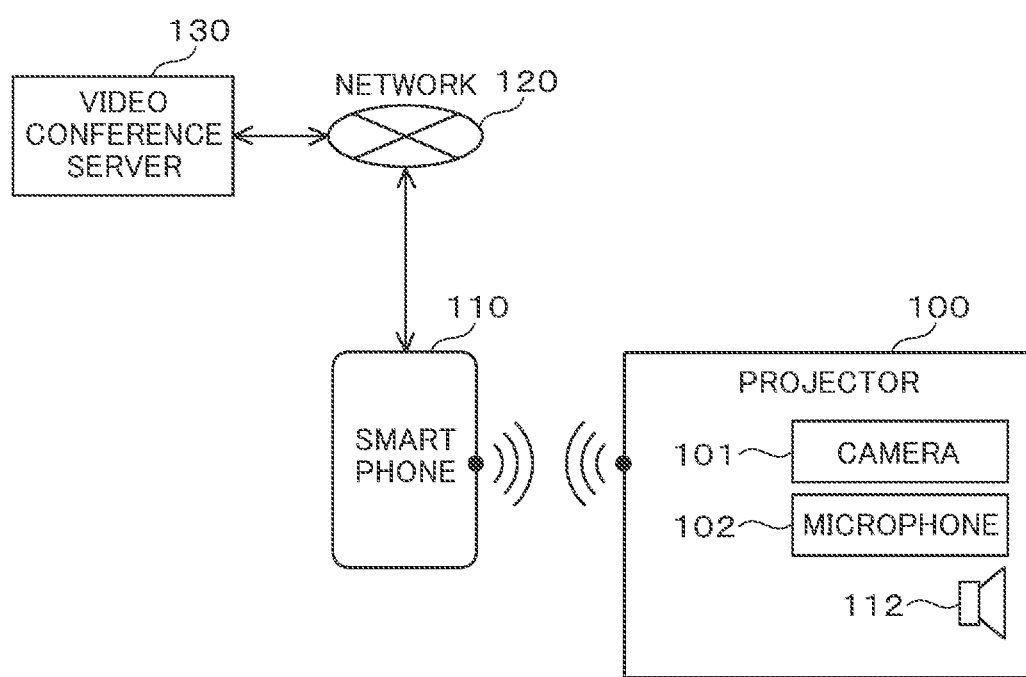
FIG. 1 is a diagram illustrating an example of a system configuration according to a first embodiment.

FIG. 1 is a diagram illustrating an example of a configuration of a video conference system according to the present embodiment. The video conference system of the present embodiment includes, for example, a projector 100, a smartphone 110, a network 120, and a video conference server 130. The projector 100 is a device for projecting a video so that the video can be seen by a plurality of persons, and a video conference camera 101, a microphone 102, and a speaker 112 are installed in the projector 100.

In the example of FIG. 1, the camera 101, the microphone 102, and the speaker 112 are installed in the projector 100, but the camera 101, the microphone 102, and the speaker 112 may be externally attached to the projector 100 if necessary, and a plurality of cameras 101, a plurality of microphones 102, or a plurality of speakers 112 may be installed.

The projector 100 and the smartphone 110 communicate with each other through a predetermined inter-apparatus communication unit built in each of the projector 100 and the smartphone 110. The inter-apparatus communication unit may perform communication via a wireless local area network (LAN) such as Wi-Fi (a registered trademark) or may perform communication via a wired LAN. Further, other wired or wireless communication such as USB, Bluetooth (a registered trademark), IrDA (a registered trademark), near field communication (NFC) or the like may be used.

Here, Wi-Fi is a wireless LAN standard established by an Institute of Electrical and Electronic Engineers (IEEE) standard. USB is a standard established by USB Implementers Forum (USB-IF). Bluetooth is a standard established by a Bluetooth Special Interest Group (Bluetooth SIG).

The network 120 is a network in which communication can be performed between apparatuses at remote sites or in a company such as the Internet, an in-house network, or the like. A wireless LAN such as Wi-Fi, or a wired LAN may be included as all or part of the network 120. Further, the network 120 may include a mobile communication network used for mobile phones or the like.

The video conference server 130 performs management of a connection between terminals and transfer of data such as a video and a sound transmitted from each terminal in order to make it possible to perform transmission and reception of a video and a sound among a plurality of terminals participating in the same video conference upon receiving a video conference start request from a terminal connected to the network 120 such as the smartphone 110. Further, the video conference server 130 may accumulate video information of a material distributed at the video conference and distribute the video information to a plurality of terminals participating in the same video conference. A sound may be included in the information of the materials to be distributed.

Figure 2:
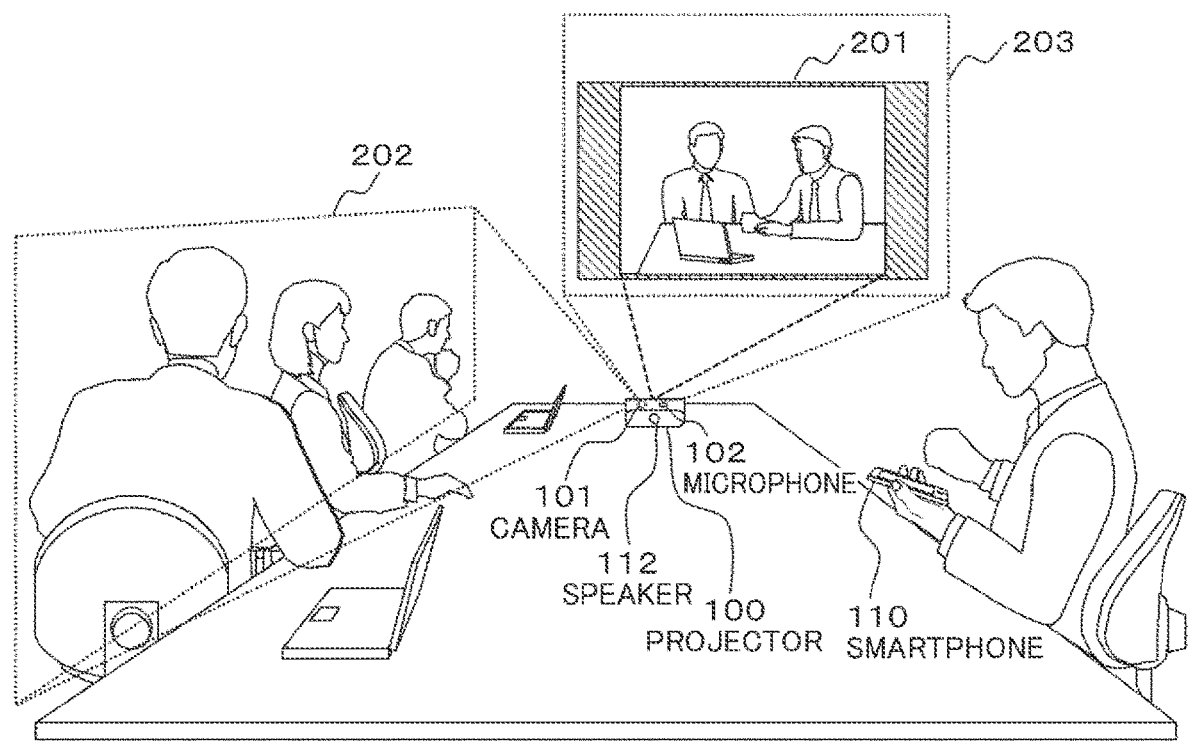
FIG. 2 is a diagram illustrating an example of a video conference.

FIG. 2 is a diagram illustrating an example of a form in which the user uses the video conference system. In the example of FIG. 2, a form in which the projector 100 is placed on a conference table surrounded by a plurality of persons, and the video conference is performed using the video conference application of the smartphone 110 is illustrated. The smartphone 110 transmits a video and a sound to the projector 100, and a camera video of the other party of the video conference is shown in a projection video 201 of the projector 100 as the video transmitted to the projector 100. Further, a sound collected by a microphone of the other party of the video conference is output from the speaker 112 of the projector 100 as the sound transmitted to the projector 100.

In the example of FIG. 2, the camera video of the other party is projected on the projection video 201, but the present invention is not limited thereto, and the video of the material accumulated in the video conference server 130 may be projected or may be switchable by a switch (not illustrated). Further, the projection video 201 may be divided into two, and the camera video of the other party and the video o the material may be simultaneously projected.

The video captured by the camera 101 installed in the projector 100 and the sound collected by the microphone 102 are transmitted to the smartphone 110 and input to the video conference application of the smartphone 110. The camera 101 may image an imaging range 202 for participants in the video conference, or a plurality of imaging ranges 202 may be set so that some of a plurality of participants are imaged.

Further, the camera 101 may image an imaging range 203 including the projection video 201. The video of the material is projected on the projection video 201, and for example, the participant points to a specific part of the material and explains it or overwrites a part of the material, and thus content to be explained to the other party of the video conference is easily conveyed. The imaging range 202 and the imaging range 203 of the camera 101 may be switchable by a switch (not illustrated), the camera 101 may be physically movable, or both the imaging range 202 and the imaging range 203 may be imaged at the same time.

Further, the camera 101 may image a paper material, a sample item, or the like placed on the conference table as the imaging range.

Figure 3:
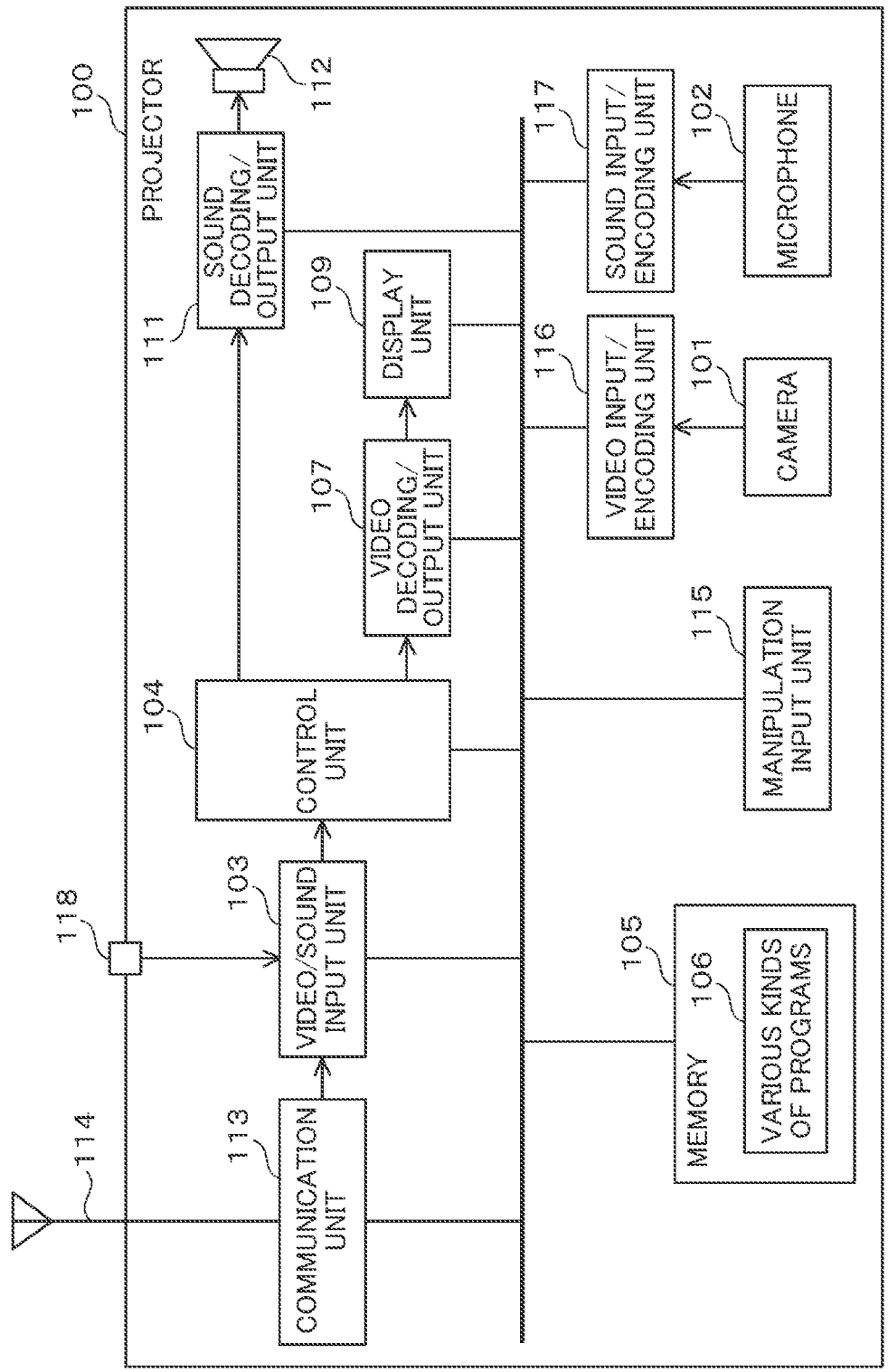
FIG. 3 is a diagram illustrating an example of a configuration of a projector.

FIG. 3 is a diagram illustrating an example of a configuration of a projector 100. The projector 100 includes, for example, a camera 101, a microphone 102, a video/sound input unit 103, a control unit 104, a memory 105, a video decoding/output unit 107, a display unit 109, an sound decoding/output unit 111, a speaker 112, a communication unit 113, an antenna unit 114, a manipulation input unit 115, a video input/encoding unit 116, an sound input/encoding unit 117, an input terminal 118, and the like, and the respective units are connected via a bus as illustrated in FIG. 3.

The control unit 104 includes, for example, a processor, and receives information of an input manipulation of the user via the manipulation input unit 115 and controls the respective units connected to the bus of the projector 100 by executing various kinds of programs 106 stored in the memory 105. For example, the control unit 104 reads a programs among various kinds of programs 106 from the memory 105, and controls the video input/encoding unit 116 and the communication unit 113 in accordance with the read program such that the video input/encoding unit 116 receives and encodes the video captured by the camera 101, and the encoded video is transmitted from the communication unit 113.

The control unit 104 is a system-on-a-chip (SoC) and may include a circuit that separates video/sound information input from the video/sound input unit 103 into sound information and video information and outputs the sound information and the video information to the sound decoding/output unit 111 and the video decoding/output unit 107 in addition to the processor. Detailed description of the control of each part of the projector 100 by the control unit 104 executing various kinds of programs 106 is omitted, and an operation of the projector 100 will be described with reference to FIGS. 5 and 7.

The memory 105 stores various kinds of programs 106 executed by the control unit 104, data which is written and read out by the control unit 104, and the like. Setting information of the projector 100, video data, and sound data may be stored in the memory 105. Various kinds of programs 106 stored in the memory 105 may be stored in the memory 105 in advance at a time point at which the projector 100 is shipped, may be stored in a recording medium such as a semiconductor memory, or may be stored in the memory 105 via a medium connecting unit (not illustrated) and installed.

Further, various kinds of programs 106 may be downloaded from an external network via the communication unit 113, stored in the memory 105, and installed. The operation performed by the control unit 104 executing various kinds of programs 106 may be implemented by hardware as a circuit for performing the same operation.

The communication unit 113 performs communication with the smartphone 110 via the antenna unit 114 in accordance with a predetermined standard or protocol. The standard used by the communication unit 113 may be a wireless LAN such as Wi-Fi or a wired LAN. Further, other wired or wireless communication such as USB, Bluetooth, IrDA, NFC, or the like may be used, and direct communication may be performed without going through the network 120. Further, the communication unit 113 may include a plurality of chips supporting communications of different standards mounted therein or a single chip supporting communications of a plurality of standards mounted therein.

The communication unit 113 outputs the video/sound information received by the antenna unit 114 to the video/sound input unit 103, and transmits the video/sound information input from the video input/encoding unit 116 and the sound input/encoding unit 117 through the antenna unit 114. The video/sound information received by the antenna unit 114 may be output to the bus.

The video/sound input unit 103 receives the video/sound information to be projected by the projector 100 from the input terminal 118. This may be for an original use of projecting the input video of the projector 100 other than the use for the video conference or may be used for receiving a material referred to in the video conference from a personal computer or the like. To this end, the video/sound input unit 103 may output the video/sound information to the bus as well as the control unit 104.

The input terminal 118 is, for example, a composite terminal, an S terminal, a D terminal, a component terminal, a VGA terminal, a DVI terminal, an HDMI terminal, or the like. In a case in which an input from the input terminal 118 is an analog signal, the video/sound input unit 103 may convert an analog signal into a digital signal. Further, the video/sound input unit 103 may select the input from the input terminal 118 and an input from the communication unit 113 or may synthesize both inputs.

In a case in which the video/sound input unit 103 outputs the video/sound information to the bus, the communication unit 113 may receive the video/sound information via the bus and transmit the video/sound information through the antenna unit 114. At this time, the video information or the sound information may be selected, and for example, the video information of the material may be transferred from the video/sound input unit 103 to the communication unit 113, and the sound information of the person participating in the conference may be transferred from the microphone 102 to the communication unit 113 via the sound input/encoding unit 117.

The video decoding/output unit 107 decodes the video information input from the control unit 104 if necessary and outputs the decoded video information to the display unit 109. For example, since the video information received by the communication unit 113 is compressed/encoded, the video information received by the communication unit 113 is decoded and output, and the video information input from the input terminal 118 may be output without change since the video information input from the input terminal 118 is not compressed/encoded. The control unit 104 may control whether or not to the decoding is performed. Part of the video information output from the video decoding/output unit 107 may be video information generated by the control unit 104 executing various kinds of programs 106.

The display unit 109 is constituted by, for example, a liquid crystal panel, an optical lens, or the like and projects a video onto a screen or the like. A video projection structure may be a digital light processing (DLP: a registered trademark), a laser light source, or the like or may be another video projection structure. Further, the display unit 109 may include a liquid crystal panel or the like that does not project a video.

The sound decoding/output unit 111 decodes the sound information input from the control unit 104 if necessary and outputs the decoded sound information to the speaker 112. For example, since the sound information received by the communication unit 113 is compressed/encoded, the sound information received by the communication unit 113 may be decoded and output, and since the sound information input from the input terminal 118 is not compressed/encoded, the sound information input from the input terminal 118 may be output without change. The control unit 104 may control whether or not the decoding is performed. The sound information output by the sound decoding/output unit 111 may be output to an external apparatus (not illustrated) in place of the speaker 112.

The speaker 112 is preferably a speaker which is omnidirectional and generates a sound with a sufficient volume for the conference. The microphone 102 is preferably a microphone which is omnidirectional and has sensitivity capable of collecting the sound of the participant on the conference table. The speaker 112 and the microphone 102 may be ones in which emphasis is placed on a sound frequency band. Further, a plurality of speaker 112 and a plurality of microphones 102 may be installed for an omnidirectional property or the like. The sound input/encoding unit 117 receives the sound information converted into an electric signal by the microphone 102, encodes the sound information to compress an information amount, and outputs the encoded sound information to the communication unit 113 via the bus.

The camera 101 images the imaging ranges 202 and 203, converts the captured video into an electric signal, and inputs the electric signal to the video input/encoding unit 116. A plurality of cameras 101 may be installed in accordance with the imaging ranges 202 and 203, or the like, and a plurality of cameras 101 may be connected to the video input/encoding unit 116. Further, the camera 101 may be mounted on the projector 100 with a physically movable structure.

The video input/encoding unit 116 receives the video information converted into an electric signal by the camera 101, encodes the video information to compress an information amount, and outputs the encoded video information to the communication unit 113 via the bus. The video input/encoding unit 116 may be connected to a plurality of cameras 101, and in a case in which the video information is input from each of a plurality of cameras 101, video input/encoding unit 116 may select one of the inputs form a plurality of cameras 101 or may synthesize the inputs from a plurality of cameras 101.

The manipulation input unit 115 is an input device that receives an input manipulation to the projector 100 from the user, and is, for example, a remote controller, a keyboard, a pointing device such as a mouse or a touch panel, or the like.

In the example of FIG. 3, the structure of the projector 100 has been described, but a display that displays a video instead of projecting the video may be used as the display unit 109, and each structure described above with reference to FIG. 3 may be installed in a television receiver or a display device. In other words, the projection video 201 illustrated in FIG. 2 may be a television receiver, and the projector 100 may be included in the television receiver. In the configuration of this television receiver, the camera 101 for imaging the imaging range 202 may be installed, and the camera 101 for imaging the imaging range 203 may not be installed, or a touch panel or the like may be installed in the television receiver instead of the camera 101 for imaging the imaging range 203.

Further, a configuration in which the display unit 109 and the speaker 112 are removed from the configuration illustrated in FIG. 3, and output terminals are installed instead of the display unit 109 and the speaker 112, and it is configured with a set-top box (STB) or a recorder which does not directly display the video or output the sound may be provided. Further, instead of the projector 100, a personal computer, a monitor device, a tablet terminal, or the like including the respective components illustrated in FIG. 3 may be used.

FIG. 4 is a diagram illustrating an example of the configuration of the smartphone 110. The smartphone 110 includes, for example, a camera 405, a microphone 406, a control unit 400, a memory 403, a display unit 401, a manipulation input unit 402, a communication unit 407, a communication antenna unit 408, a mobile communication unit 409, a mobile communication antenna unit 410, and the like.

The control unit 400 includes a processor, reads out and executes various kinds of programs 412 stored in the memory 403, and controls the respective units of the smartphone 110 via a bus. The control unit 400 is an SoC and may include a circuit related to processing of videos and sounds. The display unit 401 may be a liquid crystal panel, an organic EL (Electroluminescence) display, or the like or may be integrated with a touch panel of the manipulation input unit 402. The camera 405 images a specific direction of the smartphone 110, the microphone 406 collects the sound around the smartphone 110, and a speaker 411 outputs the sound.

The communication unit 407 performs communication with the projector 100 via the communication antenna unit 408 in accordance with a predetermined standard or protocol. The communication standard is a standard in which communication with the projector 100 can be performed. In order to perform communication with the network 120 via the mobile communication antenna unit 410, a mobile communication base station (not illustrated), or the like, the mobile communication unit 409 may perform communication conforming to a mobile communication standard such as 3G, 4G, or LTE.

Further, in order to perform communication with the network 120 via the mobile communication antenna unit 410, an access point (not illustrated), or the like, the mobile communication unit 409 may perform communication conforming to a wireless LAN standard such as Wi-Fi. Further, the mobile communication unit 409 may perform communication with the network 120 via a wired LAN through a terminal (not illustrated) in place of the mobile communication antenna unit 410 and may include a plurality of chips supporting communications of different standards mounted therein or a single chip supporting communications of a plurality of standards mounted therein.

As various kinds of programs 412 stored in the memory 403, a video conference application is included. The video conference application may be a program such as a video call or the like, and may be an application program of a telephone call using the display unit 401, the camera 405, the microphone 406, and the like. Further, as various kinds programs 412, an operating system (OS) or a presentation application may be included.

Hereinafter, an operation example in which the video conference is started using the smartphone 110, and the camera 101, the microphone 102, and the speaker 112 of the projector 100 are used in the video conference will be described with reference to FIGS. 5 and 6.

Figure 5:
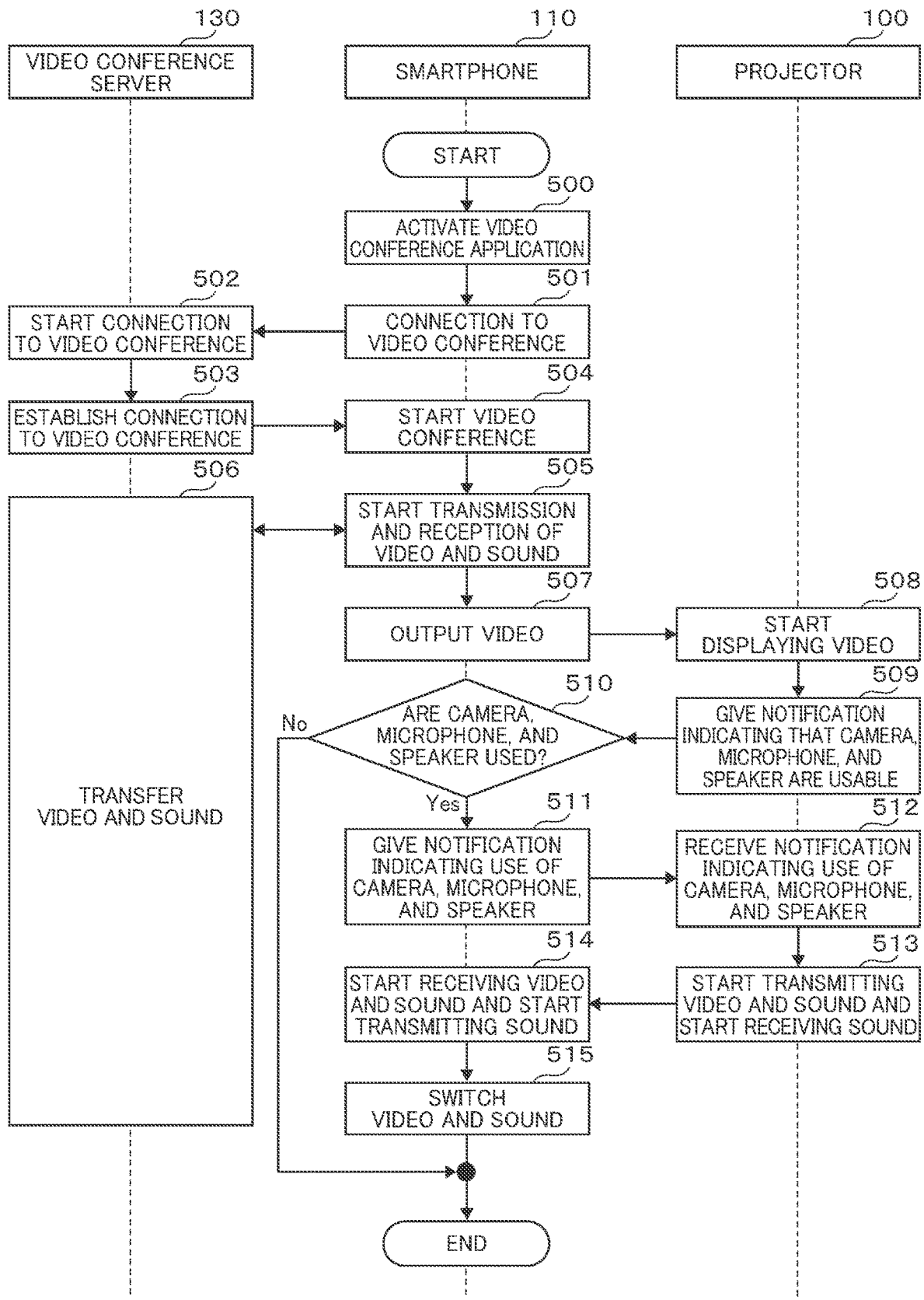
FIG. 5 is a sequence diagram illustrating an example of a first video conference start operation according to the first embodiment.

FIG. 5 is a sequence diagram illustrating an example of a video conference start operation according to the first embodiment. The video conference start operation is a sequence in which the video conference via the video conference server 130 is started using the video conference application of the smartphone 110, the display unit 109 and the speaker 112 of the projector 100 are used for the video and the sound received from the video conference server 130, and the camera 101 and the microphone 102 of the projector 100 are used for the video and the sound to be transmitted to the video conference server 130.

FIGS. 6A, 6B, and 6C are diagrams illustrating an example of a screen display of the smartphone 110. In the sequence described with reference to FIG. 5, the smartphone 110 displays the screen to be described with reference to FIGS. 6A, 6B, and 6C. The camera 405, the microphone 406, and the display unit 401 in FIGS. 6A, 6B, and 6C are similar to those described above with reference to FIG. 4, the manipulation input unit 402 is integrated with the display unit 401, and a manipulation is input when the display of the display unit 401 is touched.

Step 500: The smartphone 110 displays a plurality of icons on the display unit 401 as illustrated in FIG. 6A, detects that an icon 601 of the video conference application is selected (touched) by the user, and activates the video conference application.

Step 501: The smartphone 110 displays a screen for prompting an input of a conference ID, an account/password (authentication information), and the like for a video conference to participate in on the display unit 401, receives the conference ID, the account/password, and the like input by user, transmits the input conference ID, the account/password, and the like to the video conference server 130, and requests a connection to the video conference.

Step 502: The video conference server 130 receives the request from the smartphone 110, and starts a connection process with a terminal participating in the same video conference on the basis of the received conference ID, the account/password, and the like.

Step 503: The video conference server 130 establishes a connection with the terminal participating in the same video conference as the video conference requested by the smartphone 110, and gives a notification indicating that the connection has been established to the smartphone 110.

Step 504: The smartphone 110 starts a video conference process using the camera 405, the microphone 406, and the speaker 411 of the smartphone 110.

Step 505: The smartphone 110 transmits the video captured by the camera 405 and the sound collected by the microphone 406 to the video conference server 130. Further, the smartphone 110 receives the video and the sound of another terminal transmitted from the video conference server 130, displays the video on the display unit 401, and outputs the sound through the speaker 411.

Step 506: The video conference server 130 transfers the video and the sound received from the smartphone 110 to the terminal participating in the same conference. Further, the video conference server 130 transfers the video and the sound received from the terminal participating in the same meeting to the smartphone 110.

Step 507: The smartphone 110 displays a video output destination setting menu 602 on the display unit 401 as illustrated in FIG. 6B, detects that the "projector" is selected (touched) by the user, and transmits the display screen to the projector 100 through the communication unit 407. The video output destination setting menu 602 may be displayed if the video conference application is activated or may be displayed if a specific menu of the video conference application is selected.

Step 508: Upon detecting the reception of the display screen from the smartphone 110 through the communication unit 113, the projector 100 starts displaying the received display screen and proceeds to step 509.

Step 509: The projector 100 gives a notification indicating that the camera 101, the microphone 102, and the speaker 112 of the projector 100 are usable to the smartphone 110 through the communication unit 113.

Step 510: Upon receiving the notification from the projector 100, the smartphone 110 displays a camera/microphone/speaker use confirmation menu 603 on the display unit 401 as illustrated in FIG. 6C, the process proceeds to step 511 if "Yes" is selected (touched) by the user, and the video conference start operation ends if it is detected that "No" is selected (touched).

Step 511: Since "Yes" is selected in the camera/microphone/speaker use confirmation menu 603, the smartphone 110 gives a notification indicating the use of the camera 101, the microphone 102, and the speaker 112 to the projector 100 through the communication unit 407.

Step 512: Upon receiving the notification of step 511 from the smartphone 110 through the communication unit 113, the projector 100 starts imaging and sound collection using the camera 101 and the microphone 102 of the projector 100.

Step 513: The projector 100 starts transmitting the video captured by the camera 101 of the projector 100 and the sound collected by the microphone 102 to the smartphone 110 through the communication unit 113, and starts receiving the sound from the smartphone 110 so that the sound can be output through the speaker 112.

Step 514: The smartphone 110 starts receiving the video and the sound from the projector 100 through the communication unit 407, and starts transmitting the sound to the projector 100.

Step 515: The smartphone 110 switches the video and the sound to be transmitted to the video conference server 130 from the video and the sound obtained by the camera 405 and the microphone 406 of the smartphone 110 to the video and the sound received from the projector 100, and switches the sound received from the video conference server 130 from the output of the speaker 411 to the transmission of the sound to the projector 100.

As described above, when the video conference is started using the application used in the smartphone 110, and the smartphone 110 outputs the video to the projector 100, the projector 100 gives a notification indicating that the camera 101, the microphone 102, and the speaker 112 of the projector are usable to the smartphone 110, and thus a cooperation can be easily achieved.

Further, since the smartphone 110 uses the video and the sound obtained by the camera 101 and the microphone 102 of the projector 100 in the video conference and uses the speaker 112 for the sound of the video conference, it is possible to use the camera, the microphone, and the speaker suitable for the conference using the smartphone 110 which is daily used by the user and the application thereof, and thus it is possible to improve the convenience of the user.

Further, since the information of the smartphone 110 can be used as the information for participating in the video conference (the authentication information, the password, or the like), it is easy to input information, special dedicated information is unnecessary, and it is easy to use a popular participation procedure.

In the example of the sequence illustrated in FIG. 5, after the video conference is started in the smartphone 110 (step 504), the video output to the projector 100 and the use of the camera 101, the microphone 102, and the speaker 112 of the projector 100 are started, but this sequence is not limited.

Figure 7:
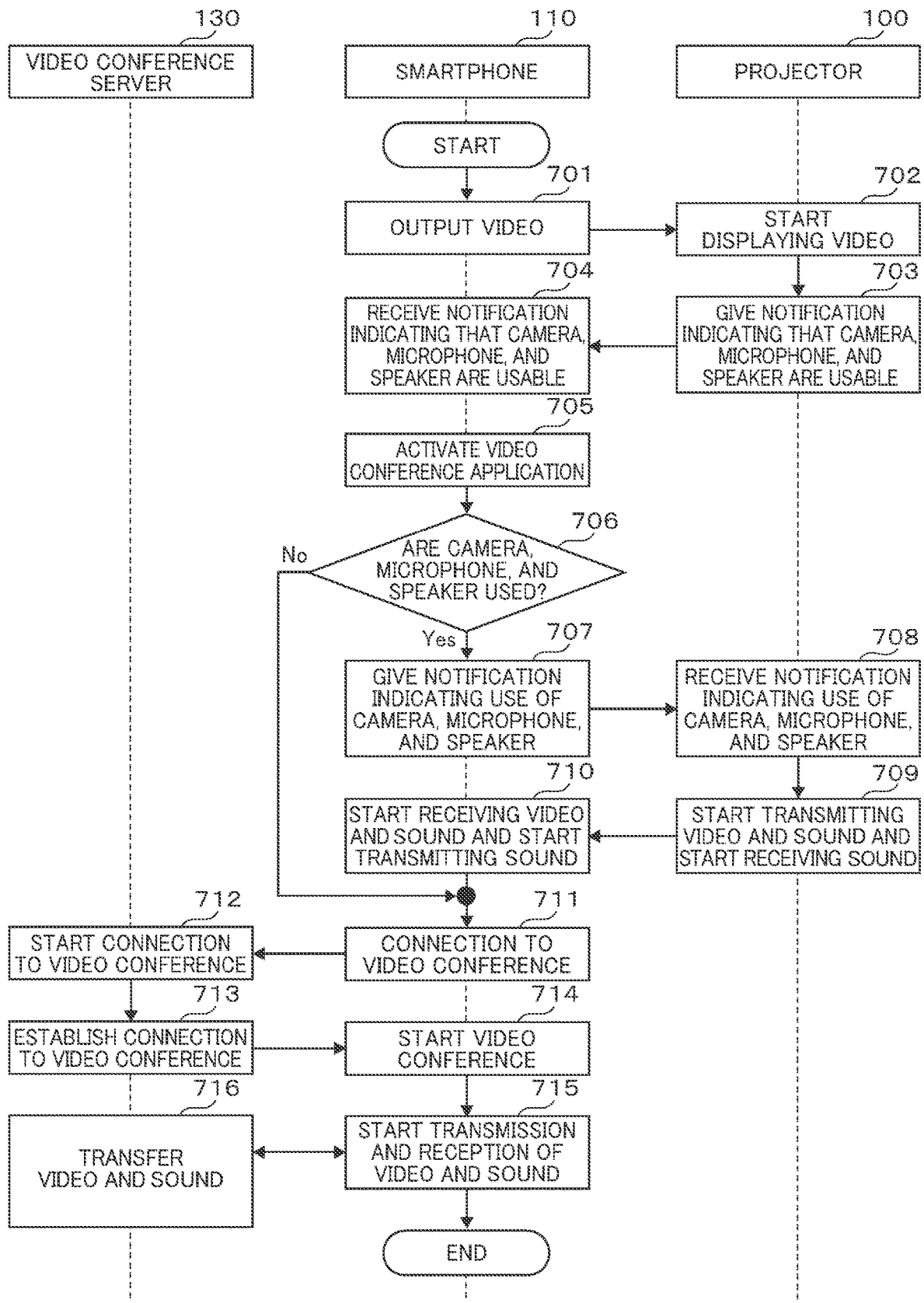
FIG. 7 is a sequence diagram illustrating an example of a second video conference start operation according to the first embodiment.

For example, as illustrated in FIG. 7, before the video conference is started by the smartphone 110 (step 714), the video may be output from the smartphone 110 to the projector 100 (step 701), and at a time point at which the video conference application is activated (step 705), the camera 101, the microphone 102, and the speaker 112 of the projector 100 may become usable.

Step 701 to step 703 of FIG. 7 correspond to step 507 to step 509 of FIG. 5, and the smartphone 110 receives the notification in step 704. Thereafter, if the video conference application of the smartphone 110 is activated in step 705, the smartphone 110 executes step 706 on the basis of the notification received in step 704 in advance. Step 707 to step 710 correspond to step 511 to step 514, and step 711 to step 714 correspond to step 501 to step 504.

Step 715 to step 716 correspond to step 505 to step 506, but in step 505, the camera 405 or the like of the smartphone 110 is used, whereas in step 710, if step 710 is already executed, the camera 101 or the like of the projector 100 is used.

Further, when the smartphone 110 is outputting a screen of an application in which it is unnecessary to use the camera, the microphone, and the speaker such as a presentation application to the projector 100, the camera/microphone/speaker use confirmation menu 603 illustrated in FIG. 6C is not displayed, and the camera/microphone/speaker use confirmation menu 603 is displayed only when an application in which it is necessary to use the camera, the microphone, and the speaker such as the video conference application is activated, the menu display is not complicated, and the convenience of the user can be improved.

The communication unit 113 of the projector 100 and the communication unit 407 of the smartphone 110 may enter a communicable state in advance, for example, by pairing of Bluetooth or an operation equivalent thereto. Further, the video output from the smartphone 110 to the projector 100 may be a video output by execution of the OS of the smartphone 110.

In step 701, if the video can be output by the execution of the OS, a type of video is not limited, and it may be the output of the same video as the video displayed on the display unit 401 of the smartphone 110. Therefore, a mirror image of the display unit 401 of the smartphone 110 may be projected by the projector 100.

As the video conference system, the configuration in which participation in the video conference is performed through communication with the video conference server 130 has been described, but the present invention is not limited to this configuration. For example, the video conference server 130 may not be provided, and the smartphone 110 may perform point-to-point (P2P) communication of directly communicating with the terminal participating in the video conference via the network 120.

Second Embodiment

A second embodiment of the present invention will be described below with reference to FIGS. 8 to 10. In the first embodiment, the projector 100 transmits the video and the sound via the smartphone 110, but in the second embodiment, the smartphone 110 is used to participate in the video conference, and the projector 100 transmits the video and the sound without going through smartphone 110. Detailed description of the same configuration as in the first embodiment will be omitted, and different configurations will be described in particular.

Figure 8:
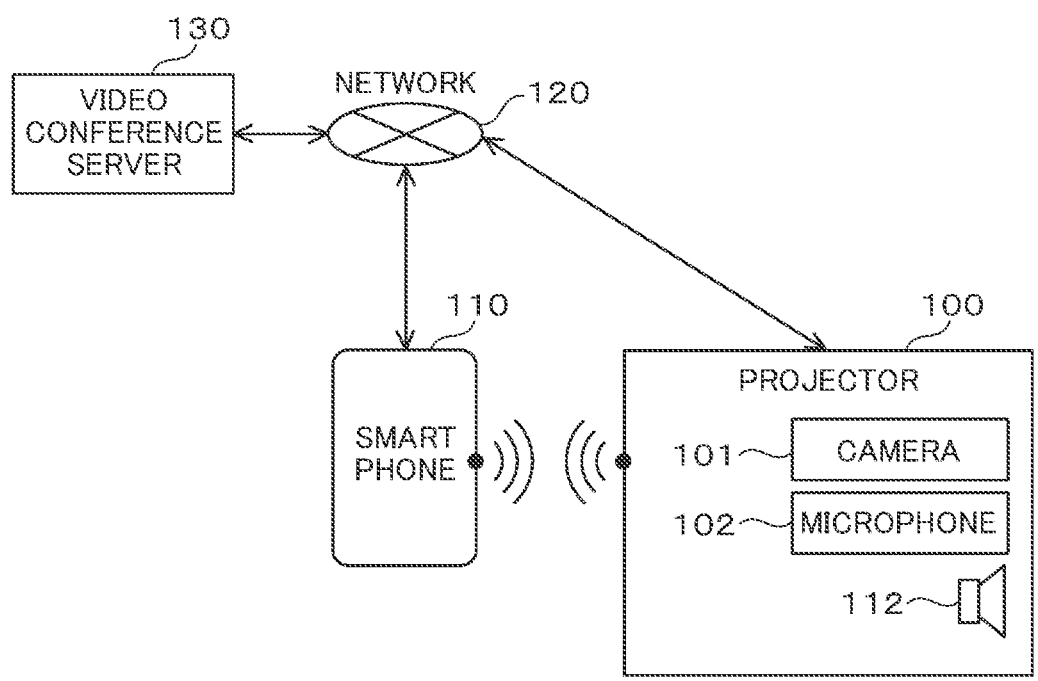
FIG. 8 is a diagram illustrating an example of a system configuration according to a second embodiment.

FIG. 8 is a diagram illustrating an example of a video conference system according to the second embodiment. A difference from the first embodiment lies in that the projector 100 can communicate directly with the network 120. Accordingly, the projector 100 transmits the video collected by the camera 101 and the sound collected by the microphone 102 to the video conference server 130 via the network 120.

The configuration of the projector 100 is similar to that described above with reference to FIG. 3, but the communication unit 113 of the projector 100 may perform communication with the network 120 via an access point or the like in addition to communication with the communication unit 407 of the smartphone 110. Further, the projector 100 may include a mobile communication unit or a wired communication unit (not illustrated) and performs communication with the network 120. The configuration of the smartphone 110 is similar to that described above with reference to FIG. 4.

Figure 9:
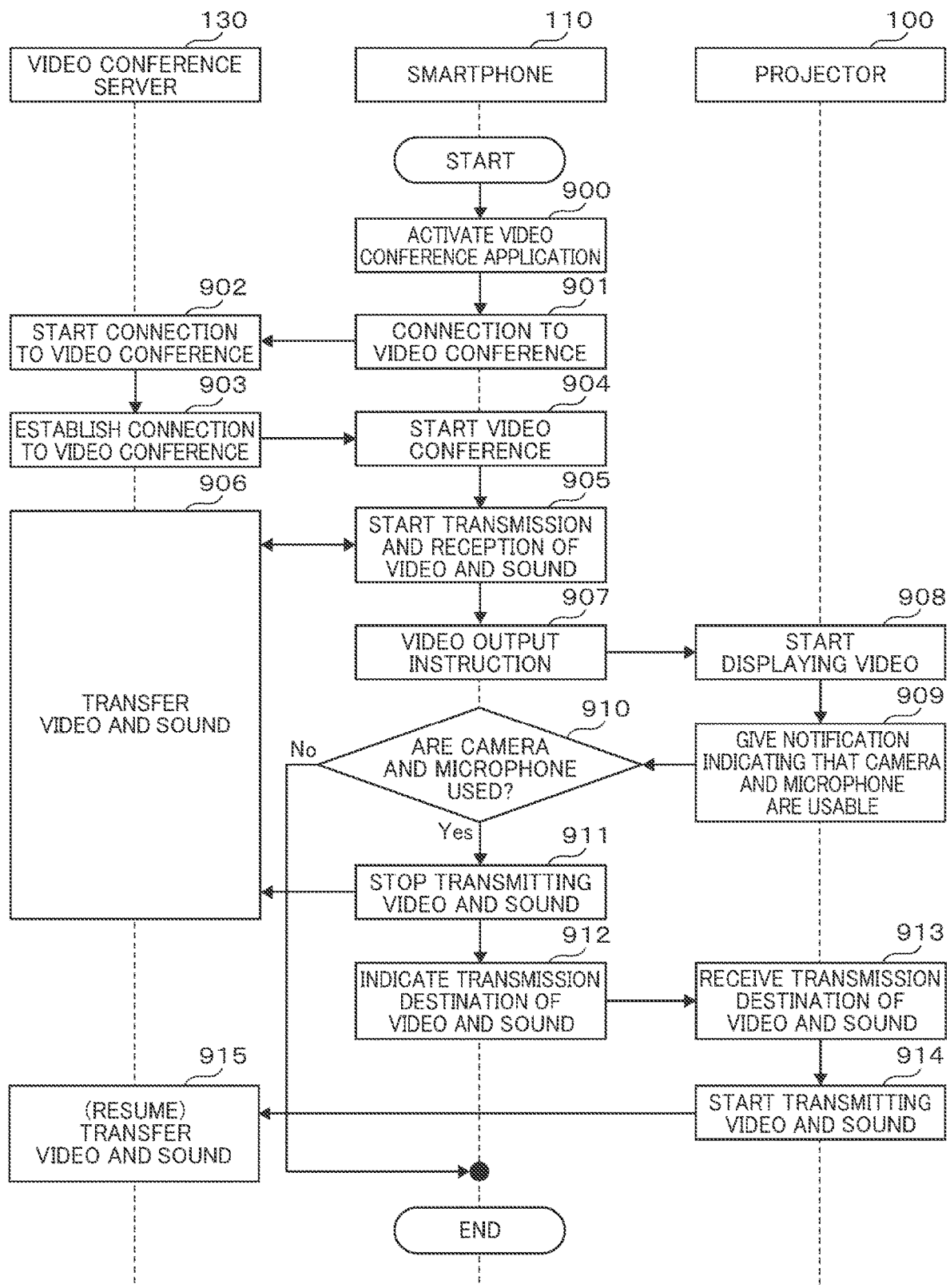
FIG. 9 is a sequence diagram illustrating an example of a first video conference start operation according to the second embodiment.

FIG. 9 is a sequence diagram illustrating an example of the video conference start operation according to the second embodiment. Step 900 to step 910 of FIG. 9 correspond to step 500 to step 510 of FIG. 5. A difference from the sequence diagram of FIG. 5, that is, step 911 and subsequent steps will be described below.

Step 911: Since "Yes" is selected in the camera/microphone use confirmation menu, the smartphone 110 stops transmitting the video and the sound using the camera 405 and the microphone 406 of the smartphone 110 which are being transmitted to the video conference server 130. Further, with the stop, transferring the video and the sound which received from the smartphone 110 to other terminals in the video conference server 130 is stopped.

Step 912: The smartphone 110 transmits the connection destination of the video conference server 130 and information necessary to a connection to the video conference such as the conference ID and the account/password (the authentication information) to the projector 100, and instructs the video conference server 130 to transmit the video and the sound. Further, the connection destination of the video conference server 130 may be information indicated by an IP address, a URL, or the like.

Step 913: The projector 100 receives the connection destination of the video conference server 130 and the information necessary for a connection to the video conference such as the conference ID and the account/password, and starts imaging and sound collection using the camera 101 and the microphone 102 of the projector 100.

Step 914: The projector 100 establishes a connection with the video conference server 130 using the connection destination of the video conference server 130 and the information necessary for a connection to the video conference such as the conference ID and the account/password received from the smartphone 110, and starts transmitting the video captured by the camera 101 of the projector 100 and the sound collected by the microphone 102.

Step 915: The video conference server 130 resumes the transfer of the video and the sound to other terminals participating in the same meeting using the video and the sound received from the projector 100.

As described above, when the video conference is started using the application used in the smartphone 110, and the smartphone 110 outputs the video to the projector 100, the projector 100 gives a notification indicating that the camera 101, the microphone 102, and the speaker 112 of the projector 100 are usable to the smartphone 110, and thus a cooperation can be easily achieved.

The smartphone 110 instructs the projector 100 to transmit the video and the sound obtained by the camera 101 and the microphone 102 of the projector 100 to the video conference server 130, and thus it is possible to use the camera 101 and the microphone 102 suitable for the conference using the smartphone 110 which is daily used by the user and the application thereof, and thus it is possible to improve the convenience of the user.

Further, since the video and the sound in the video conference are transmitted directly from the projector 100 to the video conference server 130, for example, it is possible to reduce the amount of communication data of the smartphone 110 via the mobile communication network and improve the convenience of the user.

In the example of the sequence illustrated in FIG. 9, after the video conference is started in the smartphone 110 (step 904), the video output to the projector 100 and the use of the camera 101, the microphone 102, and the speaker 112 of the projector 100 are started, but this sequence is not limited.

For example, as illustrated in FIG. 7, before the video conference is started by the smartphone 110 (step 1009), the video may be output from the smartphone 110 to the projector 100 (step 1001), and at a time point at which the video conference application is activated (step 1005), the camera 101, the microphone 102, and the speaker 112 of the projector 100 may become usable.

Figure 10:
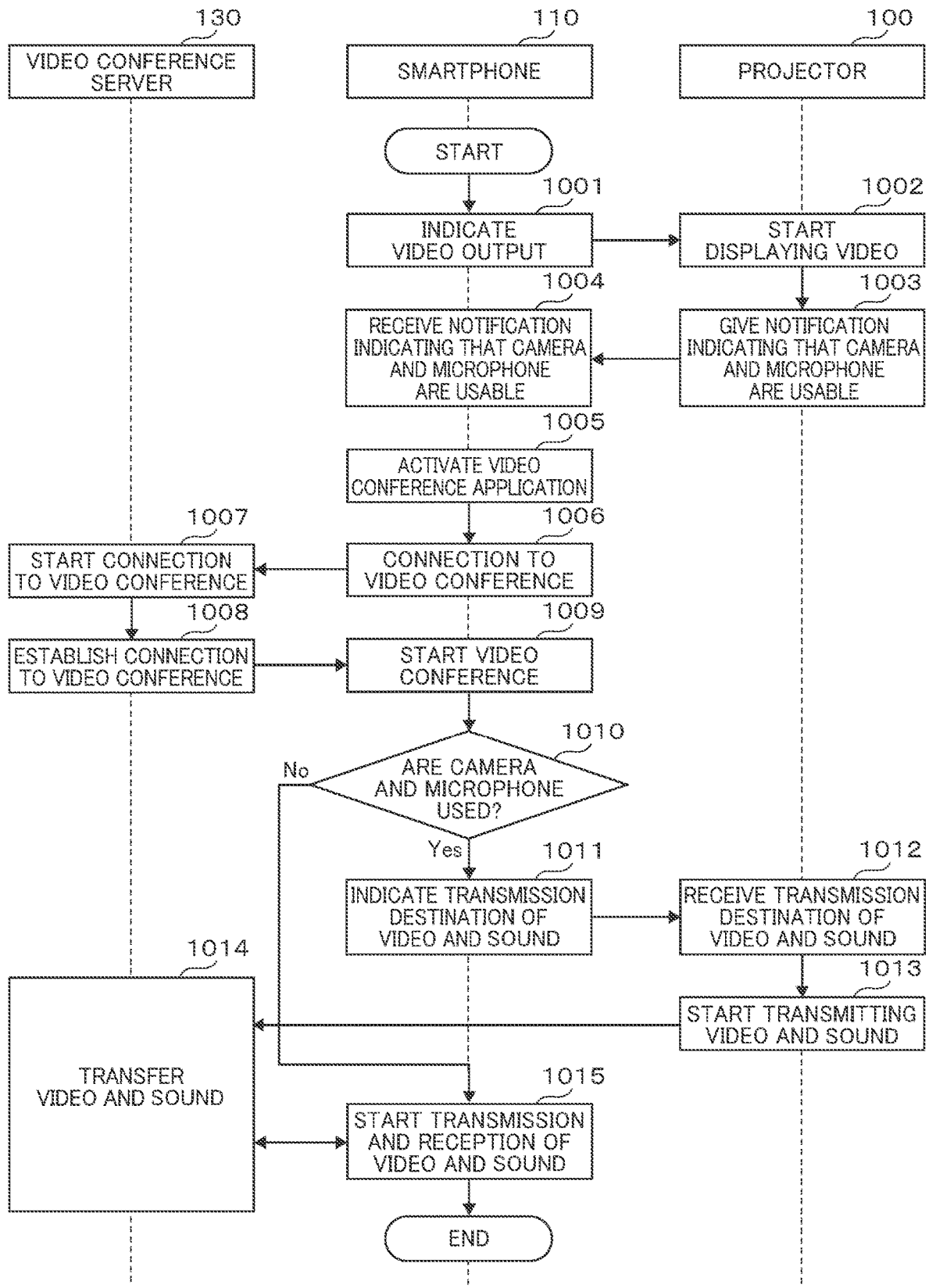
FIG. 10 is a sequence diagram illustrating an example of a second video conference start operation according to the second embodiment.

Step 1001 to step 1003 of FIG. 10 correspond to step 909 to step 909 of FIG. 9, and the smartphone 110 receives the notification in step 1004. Thereafter, in step 1005, the video conference application of the smartphone 110 is activated. Step 1006 to step 1009 correspond to step 901 to step 904, and the smartphone 110 executes step 1010 on the basis of the notification received in step 1004 in advance.

Step 1011 to step 1014 correspond to step 912 to step 915. Step 1015 corresponds to step 905, and the smartphone 110 uses the camera 405 and the microphone 406 of the smartphone 110.

Further, when the smartphone 110 is outputting a screen of an application in which it is unnecessary to use the camera and the microphone such as a presentation application to the projector 100, the camera/microphone use confirmation menu illustrated in FIG. 6C is not displayed, and the camera/microphone use confirmation menu is displayed only when an application in which it is necessary to use the camera and the microphone such as the video conference application is activated, the menu display is not complicated, and the convenience of the user can be improved.

A part of the configuration of each embodiment described above may be deleted or replaced with a part of the configuration of another embodiment, and a part of the configuration of another embodiment is added to the configuration of each embodiment.

REFERENCE SIGNS LIST

100 projector
101 camera
102 microphone
110 smartphone
112 speaker
120 network
130 video conference server
405 camera
406 microphone
411 speaker

The invention claimed is:

1. An information processing system, comprising:
a video apparatus configured to display a video; and
a wireless terminal configured to perform communication with the video apparatus and perform communication with another apparatus via a network,
wherein after information for instructing to output a video is received from the wireless terminal, the video apparatus is further configured to transmit a notification, which indicates that a camera of the video apparatus, a microphone of the video apparatus, and a speaker of the video apparatus are usable, to the wireless terminal,
wherein the video apparatus is further configured to establish connection with the other apparatus via the network in case that information necessary for establishing a connection with the other apparatus via the network is received from the wireless terminal,
wherein the wireless terminal is further configured to: i) transmit authentication information to the other apparatus; ii) establish a connection with the other apparatus via the network; and iii) display on a display of the wireless terminal, a menu screen for accepting a manipulation input for selecting whether to use the camera of the video apparatus and the microphone of the video apparatus or not,
wherein the wireless terminal is further configured to transmit information necessary for establishing a connection with the other apparatus to the video apparatus in the case that a manipulation input to select to use the camera of the video apparatus and the microphone of the video apparatus is inputted via the menu screen,
wherein the wireless terminal is further configured to transmit information of a video captured by a camera of the wireless terminal and information of a sound collected by a microphone of the wireless terminal to the other apparatus via the network in the case that a manipulation input to select not to use the camera of the video apparatus and the microphone of the video apparatus is inputted via the menu screen, and
wherein the other apparatus is further configured to: i) receive the information of the video captured by the camera of the wireless terminal and the information of the sound collected by the microphone of the wireless terminal from the wireless terminal via the network; and ii) transmit information of a video to be displayed by the wireless terminal and information of a sound to be output by a speaker of the wireless terminal to the wireless terminal via the network.

2. The information processing system according to claim 1,
wherein the camera of the video apparatus is configured to capture an image including the video displayed by the video apparatus, and
the other apparatus is a video conference server.

3. The information processing system according to claim 2,
wherein the authentication information includes information of participation in a video conference.

4. A wireless terminal for performing communication with a video apparatus that displays a video and for performing communication with another apparatus via a network, comprising:
a transceiver configured to exchange information with the video apparatus and to exchange information with the other apparatus via a network;
a display;
an input panel; and
a processor;
wherein the processor is programmed to:
control the transceiver to receive information of a video to be displayed from the other apparatus via the network and transmit the information of the video to be displayed to the video apparatus;
perform display on a display of the wireless terminal, a menu screen for accepting a manipulation input for selecting whether to use a camera of the video apparatus and a microphone of the video apparatus or not, after a notification indicating that the camera of the video apparatus and the microphone of the video apparatus are usable is received from the video apparatus;
transmit information necessary for establishing a connection with the other apparatus to the video apparatus in the case that a manipulation input to select to use the camera of the video apparatus and the microphone of the video apparatus is inputted via the menu screen; and
transmit information of a video captured by a camera of the wireless terminal and information of a sound collected by a microphone of the wireless terminal to the other apparatus via the network in the case that a manipulation input to select not to use the camera of the video apparatus and the microphone of the video apparatus is inputted via the menu screen.

* * * * *